United States Patent
Krikorian et al.

(10) Patent No.: US 7,205,927 B2
(45) Date of Patent: Apr. 17, 2007

(54) TECHNIQUE FOR LOW GRAZING ANGLE 3D SAR TARGET RECOGNITION

(75) Inventors: Kapriel V. Krikorian, Calabasas, CA (US); Dwight J. Mellema, Pasadena, CA (US); Michael Y. Pines, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 181 days.

(21) Appl. No.: 11/144,130

(22) Filed: Jun. 3, 2005

(65) Prior Publication Data

US 2006/0273946 A1    Dec. 7, 2006

(51) Int. Cl.
*G01S 13/90* (2006.01)

(52) U.S. Cl. ............... 342/25 A; 342/25 B; 342/25 C; 342/90; 342/179; 342/180; 342/189

(58) Field of Classification Search ........... 342/25 R, 342/25 A, 25 B, 25 C, 25 D, 25 E, 25 F, 342/90, 179, 180, 189, 192, 195, 196
See application file for complete search history.

(56) References Cited

U.S. PATENT DOCUMENTS

| | | | |
|---|---|---|---|
| 4,551,724 A * | 11/1985 | Goldstein et al. | 342/25 C |
| 4,924,229 A * | 5/1990 | Eichel et al. | 342/25 E |
| 4,929,950 A * | 5/1990 | Freeman et al. | 342/25 D |
| 5,262,781 A * | 11/1993 | Evans | 342/25 F |
| 5,343,204 A * | 8/1994 | Farmer et al. | 342/25 F |
| 5,677,693 A * | 10/1997 | Frankot et al. | 342/25 C |
| 5,699,452 A * | 12/1997 | Vaidyanathan | 382/168 |
| 5,742,250 A * | 4/1998 | Krikorian et al. | 342/25 C |
| 5,787,201 A * | 7/1998 | Nelson et al. | 382/224 |
| 6,741,202 B1 * | 5/2004 | Krikorian et al. | 342/25 C |
| 6,911,933 B1 * | 6/2005 | Mutz et al. | 342/25 B |
| 7,145,497 B2 * | 12/2006 | Krikorian et al. | 342/25 A |
| 2006/0273946 A1 * | 12/2006 | Krikorian et al. | 342/25 A |

* cited by examiner

*Primary Examiner*—John B. Sotomayor
(74) *Attorney, Agent, or Firm*—Leonard A. Alkov

(57) ABSTRACT

A radar on a moving platform for three dimensional target recognition of a target on a flat or sloping terrain is described. The target is illuminated from a plurality of locations to generate images at many aspect angles. The radar is positioned at a low grazing angle with respect to the target for generating a shadow of the target on the flat or sloping terrain for each aspect angle of the plurality of aspect angles. The radar comprises an analog to digital converter for converting reflections from the target induced by radar illumination into target digital data and for converting reflections induced by the illumination from the flat or sloping terrain into terrain digital data. The radar further comprises a computer for extracting radar images of the target and its shadow(s) at the plurality of aspect angles at low grazing angles; computing the slope of the terrain from the terrain digital data; correlating a plurality of the radar images to compute a three dimensional image of the target from the shadow of the target upon the flat or sloping terrain; and classifying the three dimensional image for target recognition using a target recognition algorithm.

10 Claims, 3 Drawing Sheets

TECHNIQUE FOR LOW GRAZING ANGLE 3D SAR TARGET RECOGNITION

BACKGROUND OF THE INVENTION

1. Field of Invention

This invention is in the field of radar imaging at low grazing angles for use with target identification.

2. Description of the Related Art

Synthetic Aperture Radar (SAR) radar is used for ground mapping as well as target identification. The general principle behind SAR is to coherently combine the amplitude and phase information of radar returns from a plurality of sequentially transmitted pulses from a relatively small antenna on a moving platform.

The plurality of returns creating a SAR image generated by the transmitted pulses along a known path of the platform make up an array. During the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

The plurality of pulses transmitted during a SAR array, when coherently combined and processed, result in image quality comparable to a longer antenna, corresponding approximately to the "length" traveled by the antenna during the array.

However, sometimes the ground targets of interest are relatively far away, and the radar platform is required to fly at low altitude, forcing the imaging radar to operate at shallow grazing angles. In such conditions, the ground targets cast long shadows. These long shadows may be insufficient to discern a 3D image of the target with a typical imaging process. The complexity of the imaging process may be compounded by the changes in elevation of a sloping terrain in the vicinity of the target of interest. The height of the target as compared to that of the sloping terrain is not directly discernible in the image. Therefore, interaction between elevation changes of a sloping terrain and details in the shadow cast by the target further hinder the imaging and target identification process.

SUMMARY OF THE INVENTION

Above limitations are avoided by a radar on a moving platform for three dimensional target recognition of a target on flat or sloping terrain. The sloping terrain has a slope. The target is illuminated from a plurality of aspect angles by the radar on the moving platform. The radar is positioned at a low grazing angle with respect to the target for generating a shadow of the target on the flat or sloping terrain for each aspect angle of the plurality of aspect angles. The radar comprises an analog to digital converter for converting reflections from the target induced by radar illumination into target digital data and for converting reflections induced by the illumination from said flat or sloping terrain into terrain digital data.

A computer is provided for:

a) extracting radar images of the target and its shadow at the plurality of aspect angles from the target digital data acquired at the low grazing angles;

b) computing the slope of the terrain from the terrain digital data;

c) correlating a plurality of the radar images to compute a three dimensional image of the target from the shadow of the target upon the flat or sloping terrain;

d) classifying the three dimensional image for target recognition using a target recognition algorithm.

The slope of the sloping terrain is computed from terrain digital data acquired using interferometric SAR or from a terrain database containing the slope.

The timeline for acquiring a plurality of aspect angles of the target is reduced by using interleaved SAR or a spoiled transmit beam with multiple simultaneous high gain independent receive apertures.

DETAILED DESCRIPTION OF THE INVENTION

The present invention avoids above limitations of the prior art by using a radar and method of radar operation for 3 dimensional target recognition from a plurality of SAR images acquired at different aspect angles of the target. The different aspect angles viewed from the radar illuminate the target at low grazing angles for lengthy shadows. The target is identified from the lengthy shadows cast upon uneven terrain, such as a sloping surface. The plurality of images generated while different aspect angles of target are being acquired are combined and processed using Automatic Target Recognition (ATR) methods for target recognition.

Figure 1:
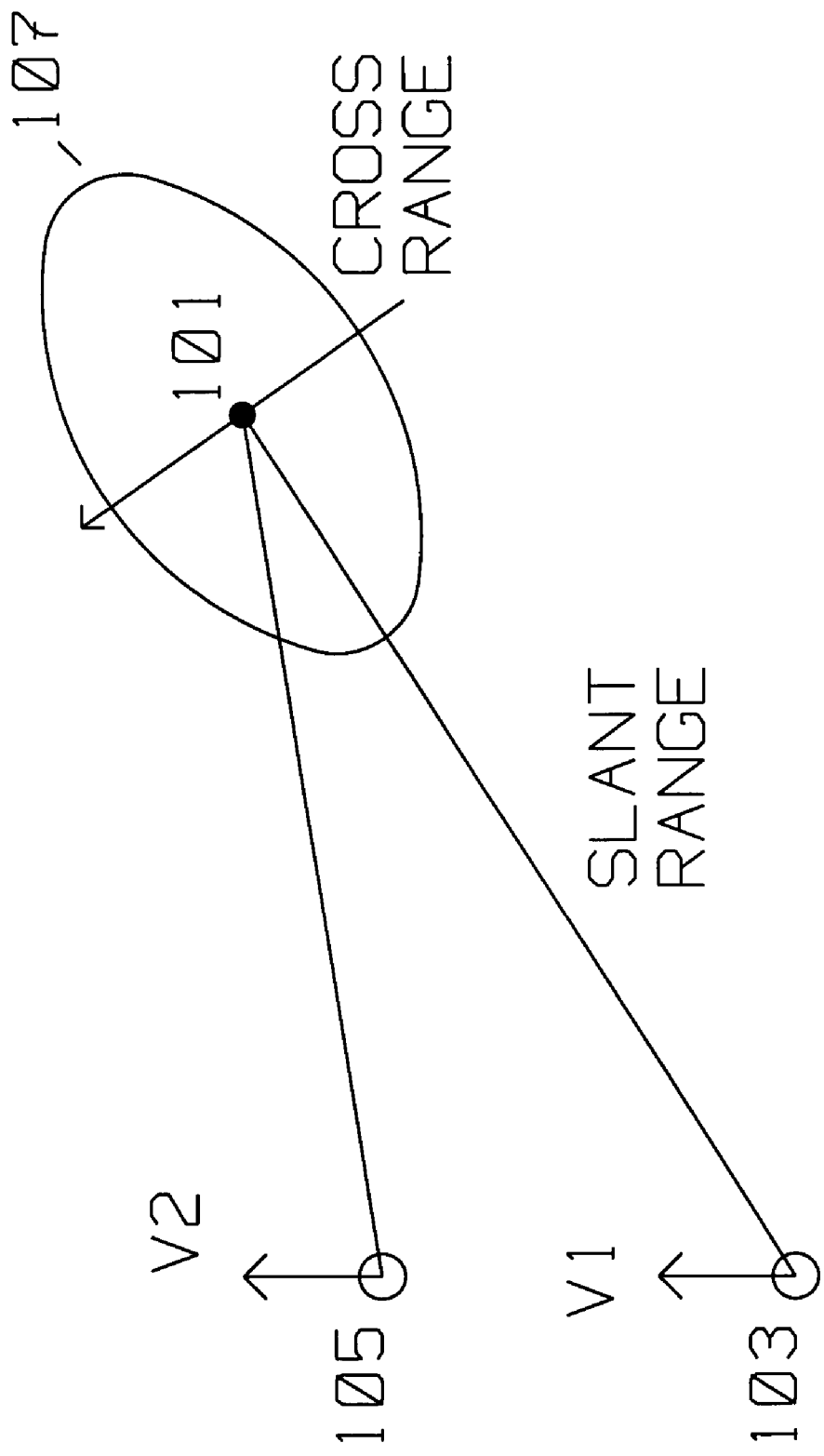
FIG. 1 is a SAR spotlight configuration where an image of a target is taken for two aspect angles.

FIG. 1 shows the typical top view of the geometric relationship between a moving platform carrying a radar transmitter/receiver using Synthetic Aperture (SAR) spotlight methods and target 101 to be imaged by said radar transmitter/receiver. Target 101 is a radar scatterer having an elevation above a ground surface, where the surface may be sloping at an elevation above sea level. The moving platform is initially at position 103 where it takes a first image of target 101 at a first aspect angle while moving with velocity V1. The moving platform then travels to position 105 where it acquires another image of the target 101 at a second aspect angle, while moving with velocity V2. Antenna illumination with radar energy covers area 107 during an array length, and includes target 101 at both positions 103 and 105. Similarly, the antenna receive pattern covers area 107, and includes target 101. While only two illumination points are shown, yielding two aspect angles of the target, a plurality of such aspect angles are envisioned. SAR radar is well known in the art and, for example, is described by W. Carrara, et al, in *Spotlight Synthetic Aperture Radar*, Artech house, 1995, incorporated herein by reference in its entirety.

Figure 2:
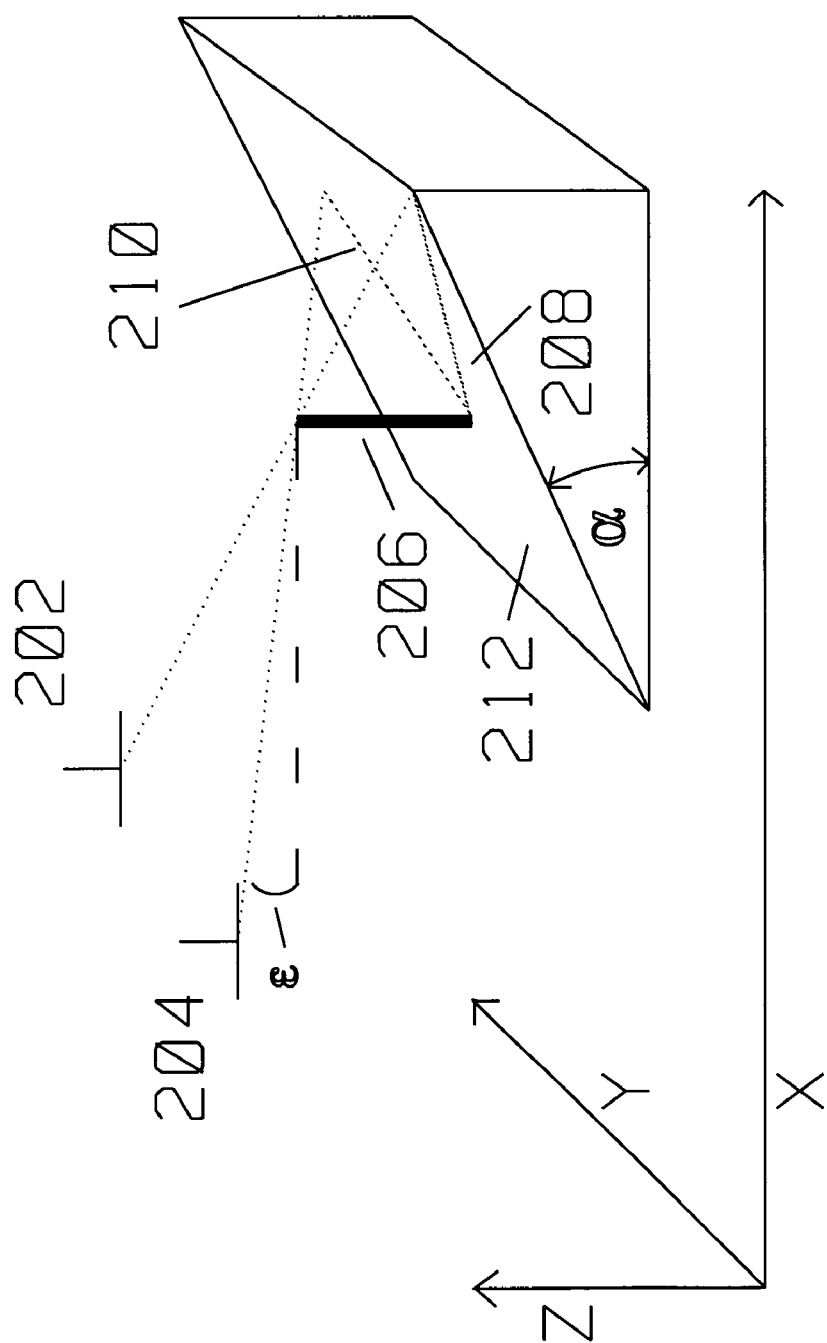
FIG. 2 shows the geometry of shadows cast by targets under shallow grazing angle conditions where a sequence of SAR images are taken of the same target at different aspect angles.

In addition to the top view shown in FIG. 1, other definitions apply for the operation of this invention, as shown in FIG. 2. The X,Y,Z Cartesian (orthogonal) coordinates provide reference. The X,Y plane defines a plane, best understood as a sea level. Moving platform 202 and moving platform 204 are at different heights along the Z coordinate above the X,Y plane. Target 206 has an extent in the Z direction perpendicularly above plane X,Y and above sloping terrain 212. Target 206 is illuminated by a radar from platform 204, generating a shadow 210 on sloping terrain 212 for a first aspect angle. Similarly, target 206 casts a shadow 208 on sloping terrain 212 at a second aspect angle when illuminated from a radar on moving platform 202.

Target 206 is illuminated from moving platform 204 at a grazing angle ϵ with respect to the X,Y plane. Sloping terrain 212 slopes at an angle α with respect to the X,Y plane and contains target 206.

Shadow 210 arises from illumination radiated from radar on platform 204 impinging onto target 206, projected along sloping terrain 212. Target 206 is perpendicularly positioned with respect to the X,Y plane. Its shadow, $L_{az}$, not shown, if projected onto the X,Y plane, has a length given by $$L_{az} = \frac{h_{az}}{\tan(\varepsilon)} \qquad 1$$

where $h_{az}$ is the height of the platform relative to the target.

However, shadow 210 cast by target 206 upon sloping terrain 212 will be shorter than that predicted by equation 1 because sloping terrain 212 will intercept the shadow cast by target 206 induced by illumination from radar on platform 204 sooner, as compared to the X,Y plane.

The radar cross range resolution provides measurements of the shape of the shadow as projected on the sloping terrain 212. The shape of the shadow is used to infer the 3 dimensional extent of the target.

A plurality of SAR images at different aspect angles are acquired to achieve a robust image of the features of the target. The plurality of SAR images, typically three or more, are combined to generate a three dimensional image of the target.

Thus, this invention is directed towards 3D target recognition. In its simplest form, the invention ascertains the height of target 206 above sloping terrain 212 from radar images acquired from a plurality of aspect angles, such as those acquired using moving platforms 202 and 204 and respective shadows 210 and 208 cast upon sloping terrain 212.

Figure 3:
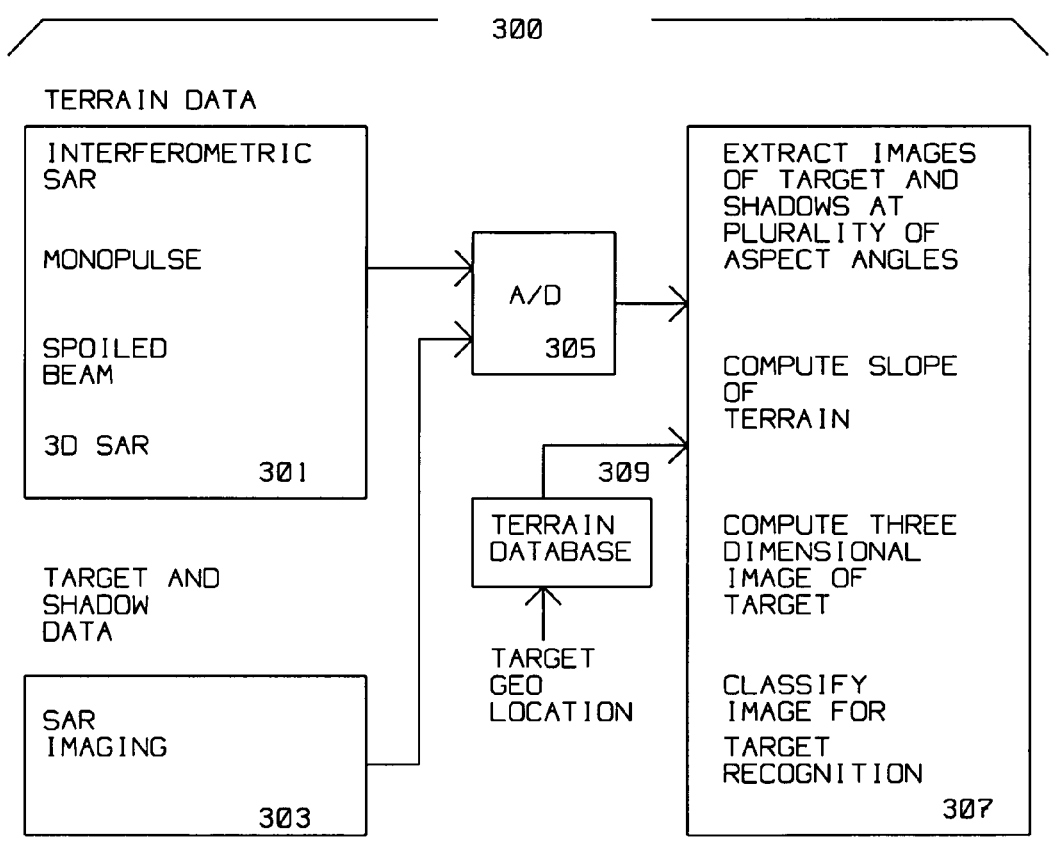
FIG. 3 shows the radar components of the present invention.

FIG. 3 in conjunction with FIG. 2 describes a radar 300 on a moving platform for three dimensional target recognition of a target 206 on a terrain 212 having a slope α. α can be zero in the case of flat terrain. The target 206 is illuminated from a plurality of locations, creating different aspect angles by the radar on the moving platform, for example located as shown by platform 202 and platform 204. The radar on the moving platform 204 is positioned at a low grazing angle ϵ with respect to the target 206 for generating a shadow 208 of target 206 on sloping terrain 212 for each aspect angle of the plurality of aspect angles. The radar comprises an analog to digital converter 305 for two purposes:

a) converting reflections induced by said illumination from said target into target and shadow (digital) data using SAR imaging 303 and b) optionally, converting reflections induced by said illumination from said sloping terrain into terrain digital data in Terrain Data 301. The terrain data is generated using various techniques to determine the slope α, such as Interferometric SAR, monopulse ground measurements, spoiled beam techniques and 3D SAR methods. Details of some of these techniques are described in U.S. Pat. No. 6,741,202, issued May 25, 2004.

In another embodiment, a terrain database 309 is used to provide terrain slope in digital format directly to computer 307. The use of a database is applicable where the degree of accuracy required is met by the database. Target geographic (geo) location is input into terrain database 309, and slope (terrain elevation), on a range bin by range bin basis is extracted for use by computer 307.

Computer 307 is used for:

a) extracting radar images of target 206 and the shadow(s) of said target at the plurality of aspect angles from the target digital data acquired at said low grazing angles;

b) computing said slope α of the sloping terrain 212 from the terrain digital data;

c) correlating a plurality of radar images extracted in (a) above to compute a three dimensional image of target 206 from the shadow of target 206 upon sloping terrain 212 and the slope α of the sloping terrain 212;

d) classifying the three dimensional image computed in (c) for target recognition using a target recognition algorithm.

A typical target recognition algorithm applicable herein compares a collection of images with the unknown, three dimensional image. MSTAR is a popular such algorithm.

In one embodiment, the slope α of sloping terrain 212 is computed from terrain digital data acquired using interferometric SAR.

In another embodiment, a plurality of aspect angles are acquired using interleaved SAR, thereby saving time in acquiring the multiple images necessitated by this invention. In agile beam radar systems, intra PRI beam switching for simultaneous imaging in multiple directions can be employed.

In another embodiment, the timeline for SAR image acquisition for a plurality of aspect angles is reduced by using a spoiled transmit beam with multiple simultaneous high gain independent receive apertures.

All references cited in this document are incorporated herein in their entirety by reference. Specifically, *Synthetic Aperture Radar* by John J Kovaly, ISBN 0-89006-056-8, Artech House, and *Radar Technology* by Eli Brookner, ISBN 0 89006 0215, Artech House, are incorporated herein in their entirety by reference to provide a background for this invention and definition of variables used herein.

Although presented in exemplary fashion employing specific embodiments, the disclosed structures are not intended to be so limited. For example, although various methods of terrain elevation measurements are outlined, others are also applicable. For example, placing a transponder, or other active device such as a GPS receiver capable of accurate measurements on sloping terrain 212 in the vicinity of target 206, will assist in obtaining the needed elevation measurement.

Those skilled in the art will also appreciate that numerous changes and modifications could be made to the embodiment described herein without departing in any way from the invention.

The invention claimed is:

1. A radar on a moving platform for target recognition of a target on a sloping terrain having a slope, said target illuminated from a plurality of aspect angles by said radar on said moving platform, said radar on said moving platform positioned at a low grazing angle with respect to said target for generating a shadow of said target on said sloping terrain for each aspect angle of said plurality of aspect angles, said radar comprising:

analog to digital converter for converting reflections induced by said illumination from said target into target digital data and for converting reflections induced by said illumination from said sloping terrain into terrain digital data;

a computer for:

extracting radar images of said target and said shadow of said target at said plurality of aspect angles from said target digital data acquired at said low grazing angles;

computing said slope of said sloping terrain from said terrain digital data;

correlating a plurality of said radar images to compute a three dimensional image of said target from said shadow of said target upon said sloping terrain and said slope of said sloping terrain;

classifying said three dimensional image for target recognition using a target recognition algorithm.

2. A radar as described in claim 1 wherein said slope of said sloping terrain is computed from terrain digital data acquired using interferometric SAR.

3. A radar as described in claim 2 wherein said slope of said sloping terrain is computed from a terrain database containing said slope.

4. A radar as described in claim 3 wherein said target digital data for said plurality of aspect angles is acquired using interleaved SAR.

5. A radar as described in claim 4 wherein said target digital data for said plurality of aspect angles is acquired using a spoiled transmit beam with multiple simultaneous high gain independent receive apertures.

6. A method for operating a radar on a moving platform for target recognition of a target on a sloping terrain having a slope, said target illuminated from a plurality of aspect angles by said radar on said moving platform, said radar on said moving platform positioned at a low grazing angle with respect to said target for generating a shadow of said target on said sloping terrain for each aspect angle of said plurality of aspect angles, said method comprising the steps of:

converting reflections induced by said illumination from said target into target digital data;

converting reflections induced by said illumination from said sloping terrain into terrain digital data;

extracting radar images of said target and said shadow of said target at said plurality of aspect angles from said target digital data acquired at said low grazing angles;

computing said slope of said sloping terrain from said terrain digital data;

correlating a plurality of said radar images to compute a three dimensional image of said target from said shadow of said target upon said sloping terrain and said slope of said sloping terrain;

classifying said three dimensional image for target recognition using a target recognition algorithm.

7. A method as described in claim 6 wherein said slope of said sloping terrain is computed from terrain digital data acquired using interferometric SAR.

8. A method as described in claim 7 wherein said slope of said sloping terrain is computed from a terrain database containing said slope.

9. A method as described in claim 8 wherein said target digital data for said plurality of aspect angles is acquired using interleaved SAR.

10. A method as described in claim 9 wherein said target digital data for said plurality of aspect angles is acquired using a spoiled transmit beam with multiple simultaneous high gain independent receive apertures.

\* \* \* \* \*